United States Patent
Yoshikawa et al.

(10) Patent No.: US 6,228,435 B1
(45) Date of Patent: *May 8, 2001

(54) PROCESS FOR TREATING BASE TO SELECTIVELY IMPART WATER REPELLENCY, LIGHT-SHIELDING MEMBER FORMED SUBSTRATE, AND PRODUCTION PROCESS OF COLOR FILTER SUBSTRATE FOR PICTURE DEVICE

(75) Inventors: Toshiaki Yoshikawa, Yokohama; Makoto Kameyama, Funabashi; Hiroyuki Suzuki, Yokohama; Nagato Osano, Kawasaki; Hirohide Matsuhisa, Yokohama; Kenichi Iwata, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/677,739

(22) Filed: Jul. 10, 1996

(30) Foreign Application Priority Data

Jul. 14, 1995 (JP) .................................................. 7-178999

(51) Int. Cl.⁷ ....................................................... C08F 2/46
(52) U.S. Cl. ...................... 427/489; 427/248.1; 427/261; 427/265; 427/269; 427/287; 427/294; 427/488; 427/535; 427/578

(58) Field of Search ...................................... 427/488, 489, 427/535, 578, 248.1, 294, 261, 265, 269, 287

(56) References Cited

U.S. PATENT DOCUMENTS

| 4,521,805 | 6/1985 | Ayata et al. ............................. 358/75 |
| 4,538,182 | 8/1985 | Saito et al. ............................ 358/280 |
| 5,552,192 | 9/1996 | Kashiwazaki et al. .............. 427/492 |
| 5,593,757 | 1/1997 | Kashiwazaki ....................... 428/195 |

FOREIGN PATENT DOCUMENTS

| 577187 | 1/1994 | (EP) . |
| 59-075205 | 4/1984 | (JP) . |
| 62-106407 | 5/1987 | (JP) . |
| 3-035031 | 2/1991 | (JP) . |
| 4-195102 | 7/1992 | (JP) . |
| 6-122776 | 5/1994 | (JP) . |

Primary Examiner—Bernard Pianalto

(57) ABSTRACT

Disclosed herein is a process for producing a color filter substrate for picture device constructed by selectively arranging light-shielding members and a plurality of coloring members different in spectral characteristics from each other on a transparent base, which comprises the steps of forming a water-repellent layer composed of a silane coupling agent on the base on which the light-shielding members are partially formed, exposing the surface of the base to oxygen plasma, and arranging a plurality of the coloring members different in spectral characteristics from each other on transparent regions of the base.

34 Claims, 2 Drawing Sheets

PROCESS FOR TREATING BASE TO SELECTIVELY IMPART WATER REPELLENCY, LIGHT-SHIELDING MEMBER FORMED SUBSTRATE, AND PRODUCTION PROCESS OF COLOR FILTER SUBSTRATE FOR PICTURE DEVICE

BACKGROUND OF THE INVENTION

1. Field of the Invention

The present invention relates to a process for treating a base such as glass, on which light-shielding members have been partially formed, to impart water repellency to the surfaces of the light-shielding members, and a light-shielding member formed substrate obtained by this treating process. In particular, the present invention relates to a production process of a color filter having excellent color characteristics and good surface evenness, and a color filter substrate for picture device produced by this process.

2. Related Background Art

As an example of picture devices, a liquid crystal color filter used in a liquid crystal display device is composed of many picture units one of which is formed of pixels of three primary colors of red, green and yellow formed on a transparent base. In order to enhance display contrast, light-shielding regions having a fixed width are provided between the individual pixels. In general, these light-shielding regions are black and designated black matrices.

The production processes of a color filter include a dyeing process in which a dyeable medium formed using a photolithographic technique is dyes, a process using photosensitive compositions in which a pigment has been dispersed, and an electrodeposition process making good use of a patterned electrode. Besides, as production processes of low cost, there are processes in which colored areas are formed by a printing method or an ink-jet method, and the like.

In the printing process or ink-jet process, by which a color filter can be provided as low cost, among the conventional production processes, it has been proposed to make good use of black matrices, which can be formed in advance by a photolithographic method, in order to prevent blurring of the individual colored regions and color mixing between adjoining colored regions to realize high-precision coloring. Therefore, it is necessary to prevent the spread of colorants outside the coloring regions intended to a material from which the black matrices are formed.

For example, Japanese Patent Application Laid-Open No. 59-75205 discloses a technique in which an ink-jet system is used to provide three colors of coloring matter on a base. In order to prevent the spread of the coloring matter outside the region intended, the paper publication states that the formation of a diffusion-preventing pattern with a substance hard to wet is effective. However, no specific technique regarding this is disclosed. Besides, even Japanese Patent Application Laid-Open No. 62-106407, which relates to a production process of a color filter by the printing process, recommends the use of inks hard to wet partition walls. However, selecting materials to form inks which easily wet a base, but hardly wet partition walls is difficult. In Japanese Patent Application Laid-Open No. 4-195101, there is disclosed a technique in which black matrices are formed from a photosensitive resin layer (generally called a positive resist) and a silicone rubber layer in that order. The black matrices are used as a mask when exposing the base from the back side of the base and developing, thereby simultaneously removing the photosensitive resin layer and the silicone rubber layer formed thereon at their exposed potions to form patterned partition walls conforming to with the black matrices. The surfaces of said partition walls are composed of a silicone rubber layer having water and oil repellency.

In the above photolithographic process, exposure is conducted from the side opposite to the black matrices, so that the alignment control of a photomask with a substrate found in the fabrication process of LSI is unnecessary. However, this process requires use of expensive materials such as the photosensitive resin and silicone rubber, and naturally needs coating steps for forming the photosensitive resin layer and the silicone rubber layer. As a result, the raw material cost and the number of steps increase, which ultimately causes a lowering in yield.

Silane coupling agents have heretofore been widely used as bonding agents between an organic material and an inorganic material and for imparting water repellency and dispersibility to materials. In general, the silane coupling agents have been used by diluting them with a solvent such as an aromatic hydrocarbon, an aliphatic hydrocarbon, or a halogenated hydrocarbon such as flon, to prepare a solution, which is applied to a surface of a base by dipping or spraying, and dried. The process using such solvents has required environmental and fireproofing measures against gases produced from waste liquids and is not preferred. Further, a fitting method to a dipping jig has become a problem in the processing of optical parts. Therefore, Japanese Patent Application Laid-Open No. 6-122776 has reported a dry treatment process for imparting, in particular, water repellency, wherein a silane coupling agent such as a fluoroalkylsilane is introduced into a vacuum container in which a base to be processed has been arranged, and plasma discharge is produced by radio-frequency or direct current, thereby providing a water-repellent layer on the surface of the base processed.

However, a detailed investigation by the present inventors as to the water-repellent surface provided by the process disclosed in Japanese Patent Application Laid-Open No. 6-122776 has revealed that a difference in water repellency arises according to the materials of bases to be processed. The measured values thereof are shown in Table 1.

TABLE 1

| Material | Contact angle with water |
| --- | --- |
| Green flat glass | 105 ± 3 |
| 7059 | 105 ± 5 |
| Molybdenum | 120 ± 2 |
| tantalum | 120 ± 3 |
| Chromium | 120 ± 3 |

(Note)
7059: Trade name of glass manufactured by Corning Co.

It has heretofore been said that when a silane coupling agent is applied to the surface of a dielectric such as glass and the surface of a metal such as molybdenum or tantalum by a wet process, the silane coupling agent is easier to fix on the glass surface rather than on the metal surface, and so the silane coupling agent is more effective for the glass surface. However, the measurement results shown in Table 1 have revealed that when the silane coupling agent is applied by a dry process using plasma reaction, the reverse is true.

SUMMARY OF THE INVENTION

It is an object of the present invention to provide a process for treating a base to selectively impart water repellency thereto, a light-shielding member formed substrate and a color filter substrate for picture device, by which the above problems involved in the prior art can be solved.

Another object of the present invention is to provide a process for treating a base to selectively impart water repellency thereto in such a manner that the areas of a light-shielding layer have high water repellency, while the other areas have low water repellency.

A further object of the present invention is to provide a light-shielding member formed substrate wherein inks of different colors can be fully spread over respective pixel parts to color them, and the inks do not mix with each other because light-shielding members having high water repellency are arranged between adjoining pixels.

A still further object of the present invention is to provide a color filter substrate wherein a difference in water repellency between regions in which light-shielding members are arranged, and the other regions is made larger in order for inks to be stably held on the other regions.

A yet still further object of the present invention is to provide a production process of a color filter substrate, by which yield is enhanced.

The present invention, by which the above objects can be achieved, has the following constitution.

According to the present invention, there is thus provided a process for treating a base to selectively impart water repellency thereto, which comprises forming a water-repellent layer composed of a silane coupling agent on a base on which light-shielding members are partially formed, and then exposing the surface of the base to oxygen plasma.

According to the present invention, there is also provided a light-shielding member formed substrate obtained by subjecting a base to the treating process described above.

According to the present invention, there is further provided a process for producing a color filter substrate for picture device constructed by selectively arranging light-shielding members and a plurality of coloring members different in spectral characteristics from each other on a transparent base, which comprises the steps of:

forming a water-repellent layer composed of a silane coupling agent on the base on which the light-shielding members are partially formed, exposing the surface of the base to oxygen plasma, and arranging a plurality of the coloring members different in spectral characteristics from each other on transparent regions of the base.

The present invention includes a color filter substrate produced by the production process described above.

According to the present invention having such constitution, the above-described objects can be achieved.

DESCRIPTION OF THE PREFERRED EMBODIMENTS

Figure 1:
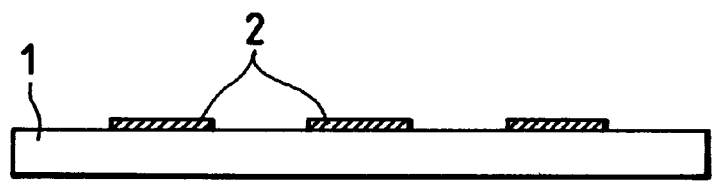
FIG. 1 is a cross-sectional view of a base for a color filter, wherein black matrices made of a thin metal film have been formed on the base according to pattern.

FIG. 1 is a cross-sectional view of a base for a color filter, wherein black matrices made of a thin metal film have been partially formed as light-shielding members on the base.

As the base 1 useful in the practice of the present invention, there may be suitably used dielectrics such as a glass base, a polycarbonate base, and ceramics such as alumina.

As the light-shielding members formed on the base 1, metals such as Cr, Mo, Ta, Ti, W and Al, and alloys thereof may be used without any limitation so far as they have necessary properties such as light-shielding properties, corrosion resistance and adhesion properties. The material for the light-shielding members is not limited to the above metals and alloys. For example, the light-shielding members may be constructed with a resin. The thickness of the metal film is preferably as thin as possible. However, the film is preferably formed in a thickness of from about 50 to 1,000 nm in view of its light-shielding properties. A light-shielding film formed on the base 1 is etched according to the desired pattern by a photolithographic process or the like, thereby obtaining a base for a color filter, wherein metal portions 2 have been formed on the base 1 as illustrated in FIG. 1.

A water-repellent film composed of a silane coupling agent is formed in a thickness of preferably from about 0.5 to 50 nm on the thus-obtained base for a color filter, wherein light-shielding portions have been formed with the thin metal film 2 between pixels patterned in advance, by a plasma polymerization process in a vacuum container.

Examples of the silane coupling agent include heptadecafluorodecyltrimethoxysilane, vinyltriethoxysilane, vinyltris(2-methoxy)silane, 3-methacryloxypropyltrimethoxysilane, 3-glycidoxypropyltrimethoxysilane, 2-(3,4-epoxycyclohexyl)ethyltrimethoxysilane, N-2-(aminoethyl)-3-aminopropylmethyldimethoxysilane, 3-aminopropyltriethoxysilane, N-phenyl-3-aminopropyltrimethoxysilane, 3-mercaptopropyltrimethoxysilane and 3-chloropropyltrimethoxysilane.

Figure 2:
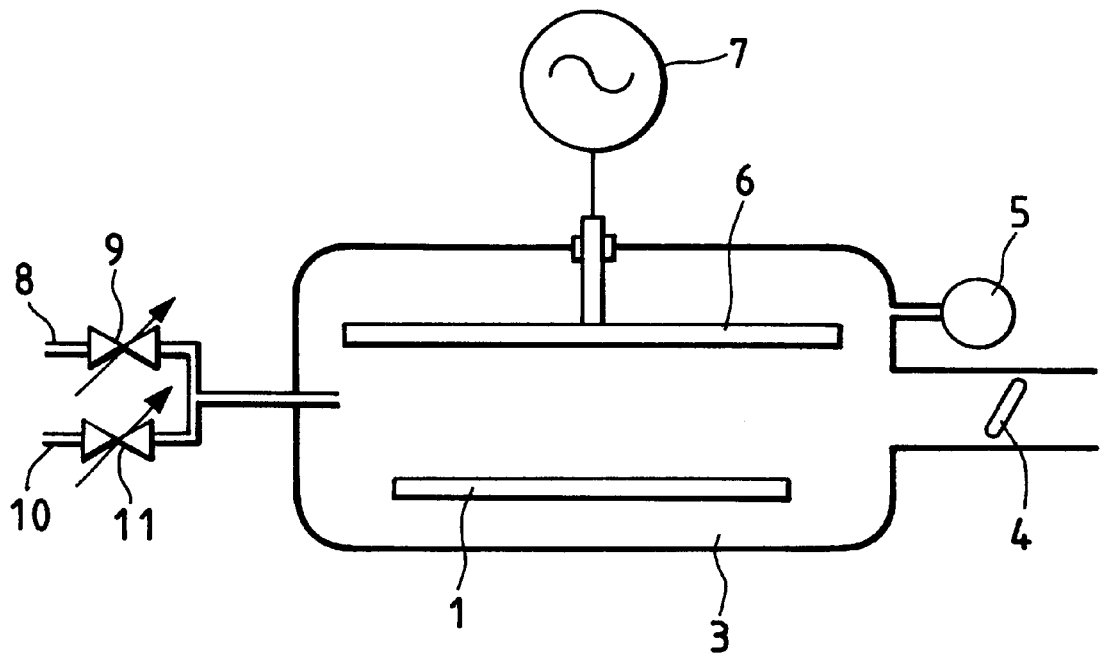
FIG. 2 schematically illustrates a vacuum container applicable to the process of the present invention.

The formation of the water-repellent film with the silane coupling agent is performed by placing the base 1, on which the thin metal film 2 has been formed according to pattern, in a vacuum container 3 illustrated in FIG. 2, evacuating gas within the vacuum container 3 by a vacuum pump and introducing the silane coupling agent into the vacuum container 3 through a pipe 8 and a valve 9.

In this case, in order to obtain vapor of the silane coupling agent, it is preferable to heat a container for the silane coupling agent, the pipe 8 up to the vacuum container 3 and the valve 9 to a temperature of from room temperature (25° C.) to 150° C., depending on the kind of the silane coupling agents used.

The pressure within the vacuum container 3 is controlled by an exhaust conductance valve 4 while measuring the pressure by a vacuum gauge 5.

When the pressure within the vacuum container 3 is stabilized, an RF field is applied to an electrode 6 for plasma discharge from an RF generator 7 for 1 second to 10 minutes in field power of from 100 to 1,000 W to produce plasma of the silane coupling agent vapor, thereby forming a water-repellent film 12 on the surface of the base.

After the formation of the water-repellent film, the silane coupling agent vapor within the vacuum container is evacuated.

After the pressure within the vacuum container 3 is reduced to 0.1 Torr or lower, oxygen gas is introduced into the vacuum container 3 through a pipe 10 and a flow regulating valve 11. The pressure within the vacuum container 3 is preferably adjusted to about $1 \times 10^{-4}$ to $10^{-2}$ Torr by controlling the exhaust conductance valve 4. When the pressure within the vacuum container 3 is stabilized, an RF field is applied to the electrode 6 for plasma discharge from the RF generator 7 to produce oxygen plasma, to which the surface of the base, on which the water-repellent film has been formed, is then exposed. At this time, the power of the RF field is preferably from 10 to 1,000 W, more preferably from 25 to 100 W, and the exposure is performed for preferably 10 seconds to 30 minutes.

Thereafter, the oxygen gas within the vacuum container 3 is evacuated, and dry gas such as nitrogen, Ar, He or $CO_2$ is introduced until the pressure within the vacuum container 3 reaches atmospheric pressure. The base is then taken out of the container to complete the treatment and processing.

Incidentally, the water-repellent layer composed of the silane coupling agent as a raw material may be formed by a known vapor deposition process.

According to the present invention, thus, the water-repellent film composed of the silane coupling agent as a raw material is formed on the light-transmitting base, wherein the light-shielding portions have been formed with the thin metal film between pixels patterned in advance, by the plasma polymerization process or the vapor deposition in the vacuum container. Thereafter, oxygen gas is introduced into the vacuum container to produce oxygen plasma, to which the surface of the light-transmitting base, wherein the light-shielding portions have been formed between the pixels patterned in advance, is then exposed, whereby the thin metal portions to serve as black matrices retain good water repellency, while the exposed glass portions to serve as pixels become hydrophilic. Thereafter, the thus-treated base is taken out of the vacuum container, and a plurality of coloring members (for example, dyeing inks) different in spectral characteristics from each other is applied to the glass portions to be used as the pixels. As a result, the coloring members applied spread over the respective hydrophilic glass portions, but can not spread to the metal portions because the metal portions retain good water repellency. Consequently, the coloring members (for example, the inks) come to color only the pixel portions on the glass surface, and the coloring members of different colors do not mix with each other between adjoining pixels, whereby a high-quality color filter can be produced with ease.

The present invention will hereinafter be described more specifically by the following Examples. However, the present invention is not limited to or by these examples.

EXAMPLE 1

A base 1 composed of a transparent glass sheet, on which a thin metal film 2 composed of an alloy of Mo and Ta had been patterned as illustrated in FIG. 1, was placed in a vacuum container 3 illustrated in FIG. 2, and gas within this vacuum container 3 was evacuated to $5.0 \times 10^{-3}$ Pa by a vacuum pump (not illustrated).

A silane coupling agent (heptadecafluorodecyltrimethoxysilane, product of Shin-Etsu Chemical Co., Ltd.) was then introduced to $5.0 \times 10^{-2}$ Pa into the vacuum container 3 through a pipe 8 and valve 9. A container for the silane coupling agent, the pipe 8 up to the vacuum container 3 and the valve 9 were then heated to about 100° C. to provide vapor of the silane coupling agent. The pressure within the vacuum container 3 was controlled by an exhaust conductance valve 4 while measuring the pressure by a vacuum gauge 5.

When the pressure within the vacuum container 3 was stabilized, an RF field was applied to an electrode 6 for plasma discharge, which had been arranged in advance in the vacuum container 3, from an RF generator 7 to produce plasma of the silane coupling agent vapor, thereby forming a water-repellent film on the surface of the base. At this time, the power of the RF field was 500 W, and the plasma discharge was conducted for 10 seconds. After the formation of the water-repellent film, the silane coupling agent vapor within the vacuum container was evacuated.

After the pressure within the vacuum container 3 was reduced to $1.0 \times 10^{-3}$ Pa, oxygen gas was introduced into the vacuum container 3 through a pipe 10 and a flow regulating valve 11. The pressure within the vacuum container 3 was adjusted to $1.0 \times 10^{-2}$ Pa by controlling the exhaust conductance valve 4. When the pressure within the vacuum container 3 was stabilized, an RF field is applied to the electrode 6 for plasma discharge from the RF generator 7 to produce oxygen plasma, to which the surface of the base, on which the water-repellent film had been formed, was then exposed. At this time, the power of the RF field was 75 W, and the plasma discharge was conducted for 5 minutes. Thereafter, the oxygen gas within the vacuum container 3 was evacuated, and dry nitrogen was introduced until the pressure within the vacuum container 3 reached atmospheric pressure. The base 1 was then taken out of the container 3 to complete the processing.

Figure 4:
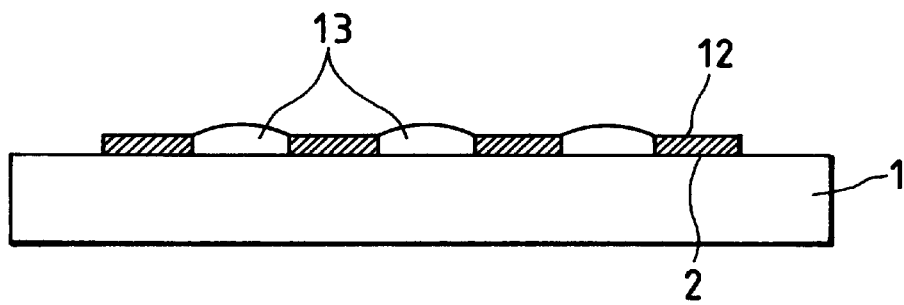
FIG. 4 is a cross-sectional view illustrating a glass base in a state that inks have been applied to exposed glass portions of the base only on the thin metal film-formed portions of which a water-repellent film has been left by exposure to oxygen plasma.

A difference in water repellency could be caused to arise between the dielectric-exposed surface and the metal portions on the base with ease and good reproducibility by the above process. As illustrated in FIG. 4, a light-transmitting material such as glass is used as a material for the base 1, and inks 13 of red, green and blue colors as a plurality of coloring members different in spectral characteristics from each other are applied to portions not covered with the metal 2 by an ink-jet system. Thus, the glass portions having low water repellency become easy to wet and are colored with high quality, while the metal portions 12 having good water repellency repel the inks. As a result, the occurrence of color mixing between pixels that the inks applied to the glass portions bleed on the metal portions, and so the inks of different colors, which are applied adjoiningly to each other, mix with each other was prevented, whereby a high-quality color filter could be produced with ease.

EXAMPLE 2

Figure 3:
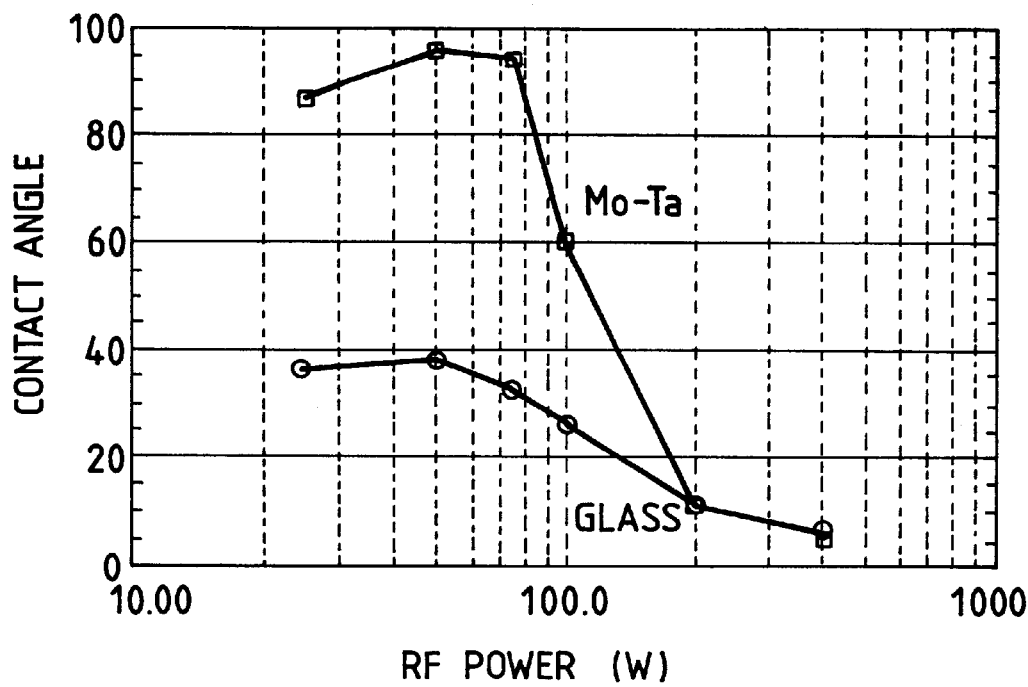
FIG. 3 is a graph illustrating difference in contact angle with water between a black matrix surface and a glass surface after exposing a water-repellent film provided on a glass base, on which black matrices have been selectively formed, to oxygen plasma with the contact angles plotted versus RF (radio-frequency) power used in the production of the oxygen plasma.

After a water-repellent film composed of a silane coupling agent (heptadecafluorodecyltrimethoxysilane, product of Shin-Etsu Chemical Co., Ltd.) and having a film thickness of 15 nm was formed on the surface of a base composed of green flat glass on which a thin metal film composed of a molybdenum-tantalum alloy (tantalum content: 15%) had been patterned, the thus-obtained substrate was exposed to oxygen plasma for 5 minutes under a pressure of $1.0 \times 10^{-2}$ Pa. Difference in contact angle with water between the glass surface and the water-repellent film on the surface of the thin metal film at this time is illustrated in FIG. 3 with the contact angles plotted versus radio-frequency power used in the production of the oxygen plasma. It is understood from FIG. 3 that the angle with water is influenced by the oxygen plasma treatment.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter substrate for picture device constructed by selectively arranging light-shielding members and a plurality of coloring members different in spectral characteristics from each other on a transparent base, which comprises the steps of:
   forming a water-repellent layer composed of a silane coupling agent by a plasma polymerization or a vapor deposition on the base on which the light-shielding members are partially formed,
   exposing the surface of the water-repellent layer to oxygen plasma to make exposed regions of said transparent base less water-repellent and easier to wet than the light-shielding members, and
   Arranging a plurality of the coloring members different in spectral characteristics from each other on said exposed transparent regions of the base.

2. The process according to claim 1, wherein the base is a glass base.

3. The treating process according to claim 1, wherein the silane coupling agent is a material selected from the group consisting of heptadecafluorodecyltrimethoxysilane, vinyltriethoxysilane, vinyltris(2-methoxy)silane, 3-methacryloxypropyltrimethoxysilane, 3-glycidoxypropyltrimethoxysilane, 2-(3,4-epoxycyclohexyl)ethyltrimethoxysilane, N-2-(aminoethyl)-3-aminopropylmethyldimethoxysilane, 3-aminopropyltriethoxysilane, N-phenyl-3-aminopropyltrimethoxysilane, 3-mercaptopropyltrimethoxysilane and 3-chloropropyltrimethoxysilane.

4. The production process according to claim 1, wherein the coloring members different in spectral characteristics from each other are composed of respective inks.

5. The production process according to claim 4, wherein the coloring members are applied in accordance with an ink-jet system.

6. The production process according to claim 1, wherein the light-shielding members are composed of a metal or alloy.

7. The production process according to claim 6, wherein the metal or alloy comprises, as a component, a metal selected from the group consisting of Cr, Mo, Ta, Ti, W and Al.

8. The production process according to claim 6, wherein the light-shielding members have a thickness ranging from 50 to 1,000 nm.

9. The production process according to claim 1, wherein the light-shielding members are composed of a resin.

10. The production process according to claim 1, wherein the water-repellent layer is formed by a plasma polymerization process.

11. The production process according to claim 10, wherein the water-repellent layer is formed in a thickness ranging from 0.5 to 50 nm.

12. The production process according to claim 10, wherein in the formation of the water-repellent layer, a pipe, through which a raw material of the silane coupling agent is fed to a vacuum container, is kept at a temperature ranging from 25 to 150° C.

13. The production process according to claim 10, wherein the formation of the water-repellent layer is performed by producing plasma in the vacuum container.

14. The production process according to claim 10, wherein the plasma is produced by applying field power ranging from 100 to 1,000 W using a radio-frequency field.

15. The production process according to claim 1, wherein the oxygen plasma is produced with the interior of the vacuum container kept at a vacuum state ranging from $1 \times 10^{-4}$ to $1 \times 10^{-2}$ Torr.

16. The production process according to claim 15, wherein the oxygen plasma is produced by introducing oxygen gas into the vacuum container and applying a radio-frequency field.

17. The production process according to claim 16, wherein the power of the radio-frequency field falls within a range from 10 to 1,000 W.

18. The production process according to claim 17, wherein the power of the radio-frequency field falls within a range from 25 to 100 W.

19. A process for treating a base to selectively impart water-repellency thereto, which comprises:
   (a) providing an intermediate comprising a substrate and a plurality of light-shielding members formed in a pattern on said substrate;
   (b) forming a water-repellent layer composed of a silane coupling agent on said light-shielding members and on exposed portions of said substrate by a plasma polymerization or a vapor deposition and
   (c) then exposing the surface of the water-repellent layer to oxygen plasma to make the exposed portions of said substrate less water-repellent and easier to wet compared to the light-shielding members.

20. The treating process according to claim 19, wherein the light-shielding members are composed of a metal or alloy.

21. The treating process according to claim 20, wherein the metal or alloy comprises, as a component, a metal selected from the group consisting of Cr, Mo, Ti, W and Al.

22. The treating process according to claim 19, wherein the light-shielding members have a thickness ranging from 50 to 1,000 nm.

23. The treating process according to claim 19, wherein the water-repellent layer is formed having a thickness ranging from 0.5 to 50 nm.

24. The treating process according to claim 19, wherein the silane coupling agent is a material selected from the group consisting of heptadecafluorodecyltrimethoxysilane, vinyltriethoxysilane, vinyltris(2-methoxy)silane, 3-methacryloxypropyltrimethoxysilane, 3-glycidoxypropyltrimethoxysilane, 2-(3,4-epoxycyclohexyl)ethyltrimethoxysilane, N-2-(aminoethyl)-3-aminopropylmethyldimethoxysilane, 3-aminopropyltriethoxysilane, N-phenyl-3-aminopropyltrimethoxysilane, 3-mercaptopropyltrimethoxysilane and 3-chloropropyltrimethoxysilane.

25. The treating process according to claim 19, wherein in the formation of the water-repellent layer, a pipe, through which a raw material of the silane coupling agent is fed to a vacuum container, is kept at a temperature ranging from 25 to 150° C.

26. The treating process according to claim 19, wherein the formation of the water-repellent layer is performed by producing plasma in the vacuum container.

27. The treating process according to claim 26, wherein the plasma is produced by applying field power ranging from 100 to 1,000 W using a radio-frequency field.

28. The treating process according to claim 19, wherein the oxygen plasma is produced with the interior of the vacuum container kept at a vacuum state ranging from $1 \times 10^{-4}$ to $1 \times 10^{-2}$ Torr.

29. The treating process according to claim 28, wherein the oxygen plasma is produced by introducing oxygen gas into the container and applying a radio-frequency field.

30. The treating process according to claim 29, wherein the power of the radio-frequency field falls within a range from 10 to 1,000 W.

31. The treating process according to claim 30, wherein the power of the radio-frequency field falls within a range from 25 to 100 W.

32. The process according to claim 19, wherein the base is a glass base.

33. A process for treating a base to selectively impart water-repellency thereto, which comprises:
   (a) providing an intermediate comprising a substrate of glass and a light-shielding member formed in a pattern on said substrate, said light-shielding member being composed of a metal or an alloy;
   (b) forming a water-repellent layer composed of silane coupling agent on said light-shielding member and on exposed portions of said substrate by a plasma polymerization or a vapor deposition; and
   (c) then exposing the surface of the water-repellent layer to oxygen plasma to make the exposed portions of said substrate less water-repellent and easier to wet compared to the light-shielding member.

34. A process for producing a color filter of glass constructed by selectively arranging a light-shielding member and a plurality of coloring members different in spectral characteristics from each other on a transparent base, said light-shielding member being composed of a metal or an alloy, which comprises the steps of:
   forming a water-repellent layer composed of a silane coupling agent by a plasma polymerization or a vapor deposition on the base on which the light-shielding member is partially formed;
   exposing the surface of the water-repellent layer to oxygen plasma to make exposed regions of said transparent base less water-repellent and easier to wet than the light-shielding member; and
   arranging a plurality of the coloring members different in spectral characteristics from each other on said exposed transparent regions of the base.

* * * * *

UNITED STATES PATENT AND TRADEMARK OFFICE
CERTIFICATE OF CORRECTION

PATENT NO.    : 6,228,435 B1
DATED         : May 8, 2001
INVENTOR(S)   : Toshiaki Yoshikawa et al.

It is certified that error appears in the above-identified patent and that said Letters Patent is hereby corrected as shown below:

<u>Title page,</u>
Insert item: -- [74] *Attorney, Agent or Firm* — Fitzpatrick, Cella, Harper & Scinto --.

<u>Column 1,</u>
Line 30, "dyes," should read -- dyed, --; and
Line 38, "as" should read -- at --.

<u>Column 2,</u>
Line 1, "with" should be deleted.

<u>Column 7,</u>
Line 25, "Arranging" should read -- arranging --.

Signed and Sealed this

Ninth Day of March, 2004

JON W. DUDAS
*Acting Director of the United States Patent and Trademark Office*